US006440549B1

(12) United States Patent
Seo et al.

(10) Patent No.: US 6,440,549 B1
(45) Date of Patent: Aug. 27, 2002

(54) PRINTING SHEET FOR STAMP

(75) Inventors: Keiji Seo, Nagoya; Mitsunobu Suda, Ichinomiya; Takashi Okumura; Koji Sugiyama, both of Nagoya, all of (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/572,335

(22) Filed: May 18, 2000

Related U.S. Application Data

(63) Continuation-in-part of application No. 09/047,486, filed on Mar. 25, 1998, now abandoned.

(30) Foreign Application Priority Data

Mar. 28, 1997 (JP) .............................................. 9-78599
Mar. 31, 1997 (JP) .............................................. 9-79665

(51) Int. Cl.[7] .................................................. B32B 3/26
(52) U.S. Cl. .................................. 428/304.4; 428/321.3
(58) Field of Search .............................. 428/195, 321.3, 428/196, 304.4

(56) References Cited

U.S. PATENT DOCUMENTS

| | | | |
|---|---|---|---|
| 5,392,711 | A | 2/1995 | Kainuma |
| 5,611,279 | A | 3/1997 | Ando et al. |
| 5,771,806 | A | 6/1998 | Imamaki |

FOREIGN PATENT DOCUMENTS

| | | |
|---|---|---|
| GB | 2 297 717 A | 8/1996 |
| JP | 8-118771 | 5/1996 |
| JP | 8-207409 | 8/1996 |
| WO | WO 96/22874 | 8/1996 |

*Primary Examiner*—Bruce H. Hess
*Assistant Examiner*—B. Shewareged
(74) *Attorney, Agent, or Firm*—Oliff & Berridge, PLC

(57) ABSTRACT

A printing sheet used in a stamp includes a porous layer in which ink can be impregnated and a fibrous layer provided to a side of the porous layer opposite to the pattern. The porous layer carries a pattern on a surface thereof, the pattern including a non-print portion which blocks the permeation of the ink and a print portion which allows the permeation of the ink. The fibrous layer prevents the deformation of the porous layer. The fibrous layer is so constituted that ink can be impregnated therein.

39 Claims, 8 Drawing Sheets

PRINTING SHEET FOR STAMP

This is a Continuation-in-Part of application Ser. No. 09/047,486 filed Mar. 25, 1998 abandoned. The entire disclosure of the prior application(s) is hereby incorporated by reference herein in its entirety.

BACKGROUND OF THE INVENTION

The present invention relates to a printing sheet used in a stamp.

As disclosed in Japanese Provisional Patent Publication Nos. 8-118771 and 8-207409, there is a type of stamp using a porous printing sheet in which ink can be impregnated. A pattern is formed on a surface of the printing sheet, including a print portion which allows the permeation of ink and a non-print portion which block the permeation of ink.

On using the stamp, a user holds the stamp and forces the stamp to a media (such as a paper) so that the surface of the printing sheet is urged against the media. With this, ink impregnated in the printing sheet is permeated through the print portion of the printing sheet and transferred onto the media. Therefore, it is possible to repeatedly print images on the media for several times without supplying ink to the printing sheet.

In order to reduce the cost for producing the printing sheet, the conventional printing sheet is made thin. Thus, when ink is impregnated in the printing sheet, the printing sheet may be swollen. In such case, a surface of the printing sheet may be deformed, which causes the printed image to be blurred.

Further, since the printing sheet is made thin, an amount of ink to be impregnated in the printing sheet is relatively small. Thus, it is necessary to further provide a sponge-like member in the stamp. Accordingly, the number of parts of the stamp is increased and the producing cost thereof is also increased. In order to increase an amount of ink to be impregnated in the printing sheet, it is alternatively possible to make the printing sheet thicker. However, since the pores of the printing sheet are generally minute, the time required to fully impregnate ink in the printing sheet becomes longer as the printing sheet becomes thicker.

Furthermore, if the printing sheet is made thin, the elasticity thereof is relatively small. Accordingly, when the printing sheet is urged onto the media, a pressure distribution of the printing sheet may not be uniform. In order to solve this problem, it is necessary to further provide a cushion member in the stamp. Thus, the number of parts is increased and the producing cost thereof is also increased.

SUMMARY OF THE INVENTION

Therefore, the first object of the present invention is to prevent a deformation of a surface of a printing sheet. The second object of the present invention is to increase an amount of ink impregnated in the printing sheet without increasing the number of parts. The third object of the present invention is to make a pressure distribution of the printing sheet uniform.

According to one aspect of the present invention, there is provided a printing sheet including (1) a porous layer in which ink can be impregnated and (2) a fibrous layer made of fibers. The fibrous layer is provided to one side of the porous layer. The porous layer carries a pattern on a surface thereof. The pattern includes a non-print portion which blocks the permeation of the ink and a print portion which allows the permeation of the ink.

When such printing sheet is used to form image, the printing sheet is mounted to a stamp. The user holds the stamp and forces the stamp to a media (such as a paper) so that the surface of the porous layer is urged against the surface of the media. Ink (impregnated at least in the porous layer) permeates the printing portion of the porous layer, and is transferred onto the media. Thus, image is formed on the media.

In order to accomplish the first object of the present invention, the fibrous layer is so constructed as to prevent a deformation of the porous layer. With such an arrangement, even if the printing sheet is swollen, a surface of the printing sheet is not deformed. Thus, it is prevented that the printed image (on a media) is blurred.

In order to accomplish the second object of the present invention, the fibrous layer is so constituted that ink can be impregnated therein. With such an arrangement, an amount of ink to be impregnated in the printing sheet can be increased, without providing a sponge-like member or the like. Further, since it is no longer necessary to make the printing sheet thicker (for increasing the amount of impregnated ink), the time required to fully impregnate ink throughout the printing sheet does not become long.

In order to accomplish the third object of the present invention, the fibrous layer has a certain elasticity. With such an arrangement, a pressure distribution of the printing sheet (when the printing sheet is urged onto the media) is uniform, even if the porous layer is relatively thin.

Preferably, the fibrous layer includes one of a non-woven fabric and a textile having raised fabrics. In case where the porous layer includes a foamed resin, it is preferred that the foamed resin of the porous layer and the fabric of the fibrous layer entangle with each other.

According to another aspect of the present invention, there is provided a base sheet (used to produce the printing sheet) including a porous layer in which ink can be impregnated and a fibrous layer made of fibers. A pattern can be formed on a surface of the porous layer, by heating the surface according to desired image.

DESCRIPTION OF THE EMBODIMENT

An embodiment of the present invention is described with reference to the accompanying drawings.

Figure 1A:
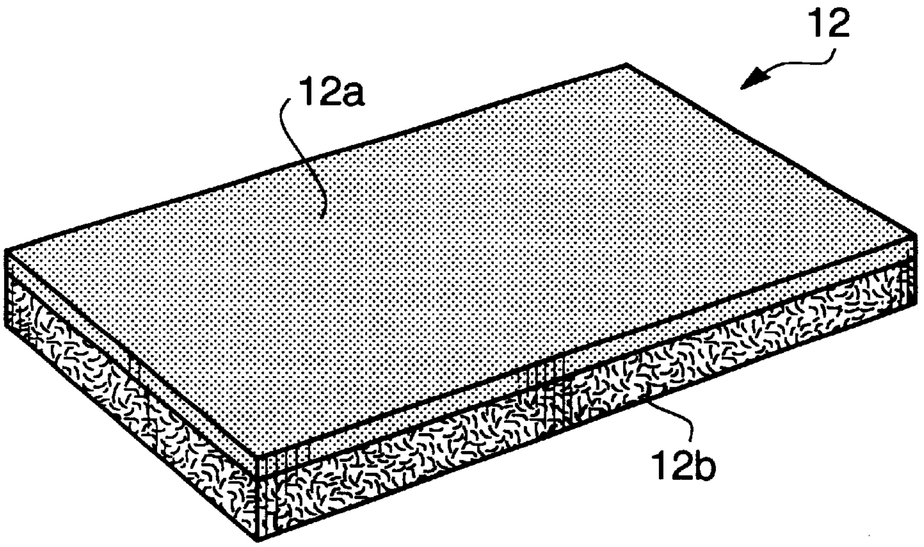
FIGS. 1A and 1B are a perspective view and a sectional view of a base sheet of a printing sheet according to an embodiment of the present invention.
Figure 1B:
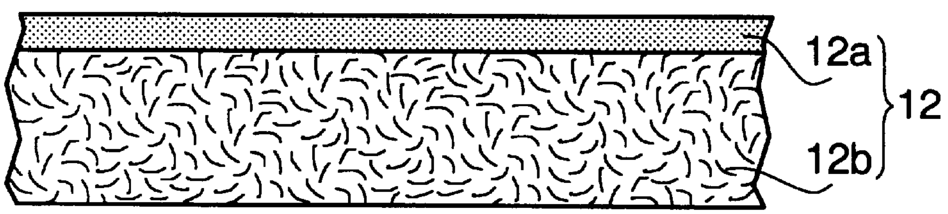

FIGS. 1A and 1B are a perspective view and a sectional view of a base sheet 12 of a printing sheet of the embodiment. The base sheet 12 includes a porous layer 12*a* and a fibrous layer 12*b* integrally provided to the lower side of the porous layer 12*a*. The porous layer 12*a* is made of a porous material in which ink can be impregnate. For example, the porous layer 12*a* is made of foamed resin such as polyolefin-based resin, polyvinyl chloride-based resin or polyurethane-based resin. The porous layer 12*a* has a certain flexibility and softness, and has an substantially uniform thickness of approximately 0.2 mm to 0.8 mm.

The porous layer 12*a* contains carbon grains uniformly dispersed therein. When the surface of the base sheet 12 is heated, the heated surface melts such that pores near the surface thereof are sealed. Thus, when the porous layer 12*a* is selectively exposed to the electromagnetic waves (such as infrared rays) according to desired image, the heated surface of the porous layer 12*a* becomes a non-print portion which blocks the permeation of ink, while the other portion becomes a print portion which allows the permeation of ink. The content of the carbon grains in the porous layer 12*a* is from 0.01 to 15 wt %. With such an arrangement, the porous layer 12*a* is gray and, when heated, turns black. Accordingly, it can be confirmed which of various colors of ink has been impregnated in the porous layer 12*a*. Further, since the carbon is greater than or equal to 0.01 wt %, the porous layer 12*a* is easily heated (such that the pores at the surface thereof are sealed) by a standard flash bulb.

The fibrous layer 12*b* may be made of a non-woven fabric that is made by adhering or entangling fibers mechanically, chemically, or thermally. For example, the fibrous layer 12*b* is made of a felt that is made from nylon fibers, polyester fibers, or polyolefin fibers. Alternatively, the fibrous layer 12*b* can be made of a raised fabric that is made by raising nap on textile. The porous layer 12*a* and the fibrous layer 12*b* may, for example, be fixed with each other in such a manner that the foamed resin material (of the porous layer 12*a*) is entangled with the fabrics of the fibrous layer 12*b*. With this, the porous layer 12*a* and the fibrous layer 12*b* are attached to form the base sheet 12. This is one example in which the porous layer 12*a* is attached to the fibrous layer 12*b* by being formed integrally with the fibrous layer 12*b*.

In order to attach the fibrous layer 12*b* to the porous layer 12*a*, various other methods can be employed. For example, the layers may be conjugated using heat, such as by fusing, cemented using adhesive, or attached by any other suitable method.

Figure 9:
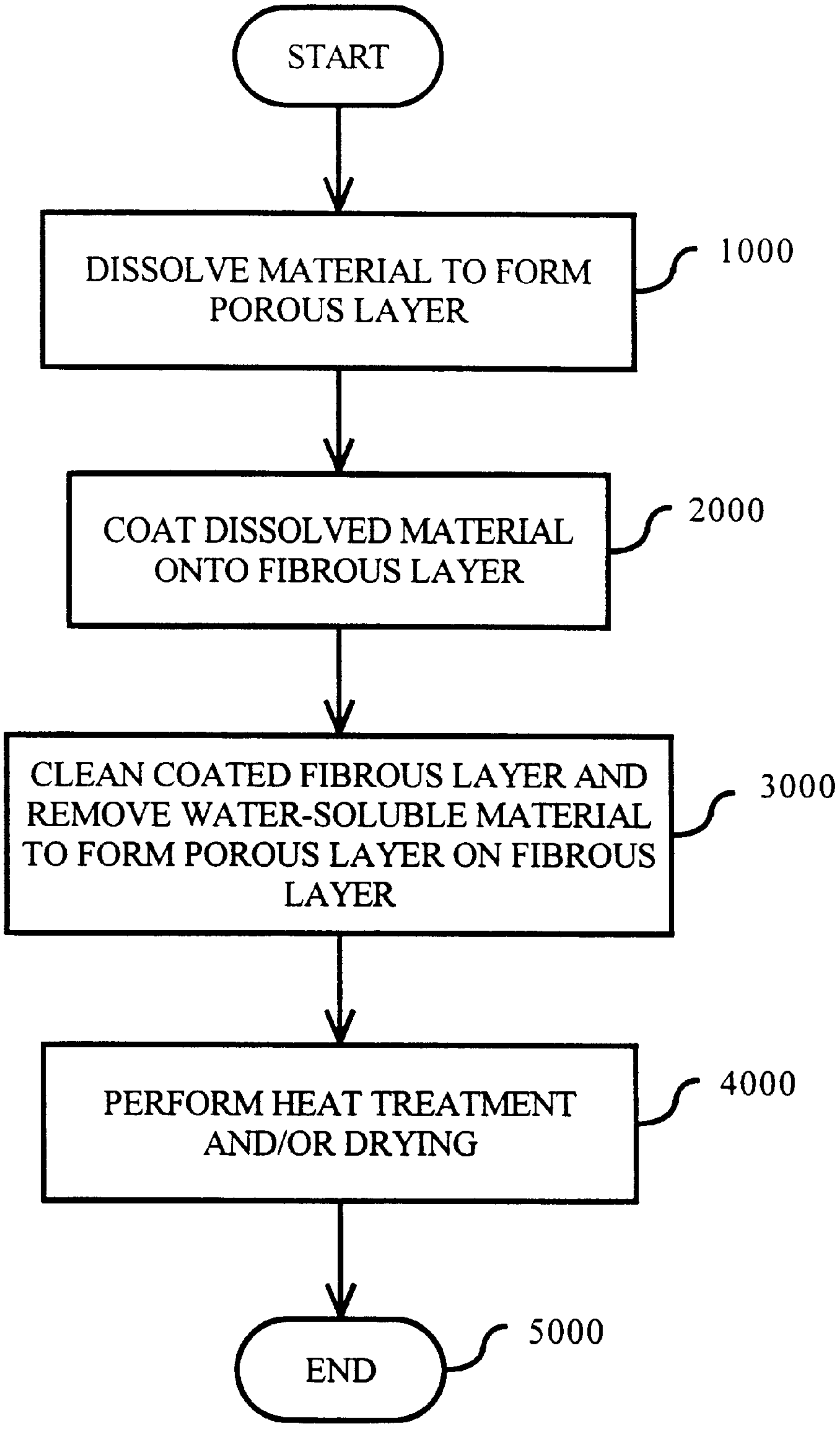
FIG. 9 is a flowchart outlining an exemplary method of forming a base sheet used to produce a printing sheet.

A method of forming the base sheet 12 is described with reference to FIG. 9. First, in step 1000, material that is to form the porous layer 12*a* is dissolved with a solvent. Then, in step 2000, the dissolved material, which is, for example, a mixture of resin and a water-soluble material, such as NaCl, is coated on the fibrous layer 12*b*. At this stage, the coated layer may not yet exhibit porosity. Therefore, in step 3000, the fibrous layer 12*b* coated with the dissolved material is soaked in water. By soaking the fibrous layer 12*b* coated with the dissolved material in water, the solvent is washed away, and the water-soluble material, such as NaCl, is dissolved out of the coated layer, leaving hollow portions to cause porosity. This results in the porous layer 12*a*. Furthermore, at this stage, a "framework" of the porous layer 12*a* is formed because the coated layer becomes hardened. Then, in step 4000, the porous layer 12*a* and the fibrous layer 12*b* are heat treated and/or dried, allowing the water in the porous layer and fibrous layer to evaporate. The process then ends in step 5000.

Since the porous layer 12*a* was applied to the fibrous layer 12*b* in a dissolved form and then hardened, the hardened material of the porous layer 12*a* entangles fibers of the fibrous layer 12*b*, thus attaching the fibrous layer 12*b* to the porous layer 12*a*.

Figure 2A:
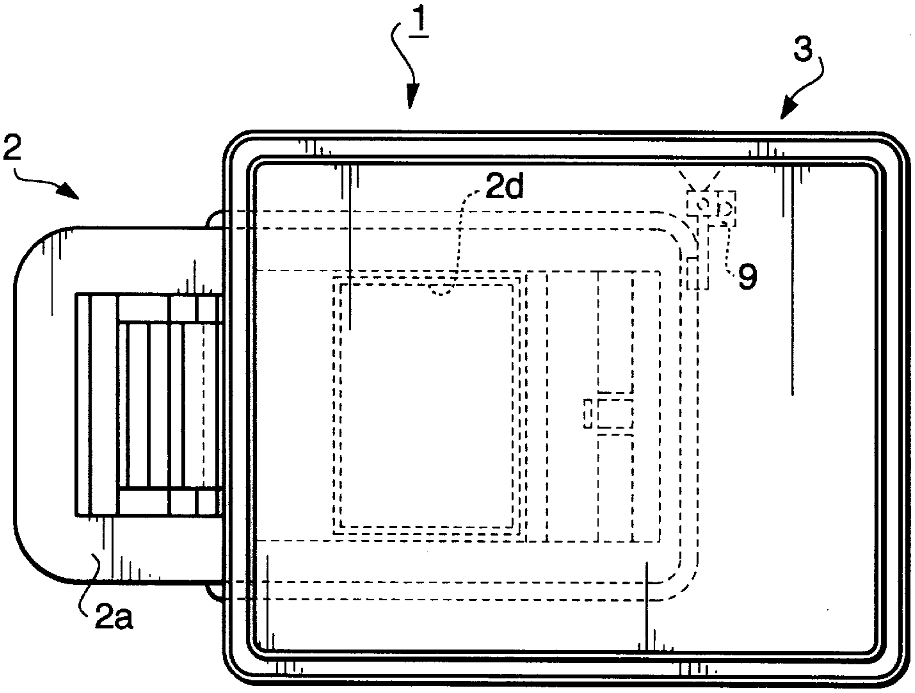
FIGS. 2A and 2B are a plan view and a sectional view of a stamp producing device for producing the printing sheet.
Figure 2B:
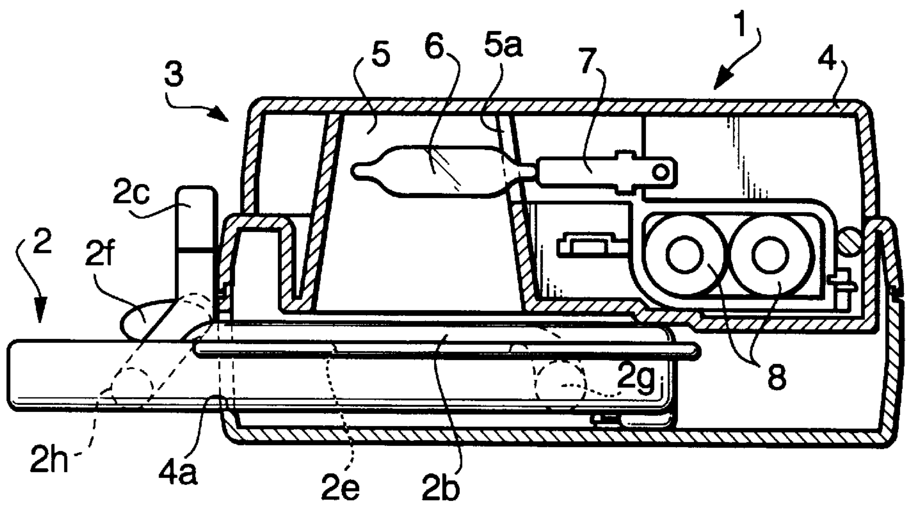

A method for producing a printing sheet is described. FIGS. 2A and 2B are a plan view and a sectional view of a stamp producing device 1 used for producing the printing sheet. The stamp producing device 1 includes a unit body 3 accommodating a flash bulb 6 and a tray 2 detachably provided to the unit body 3.

Figure 3:
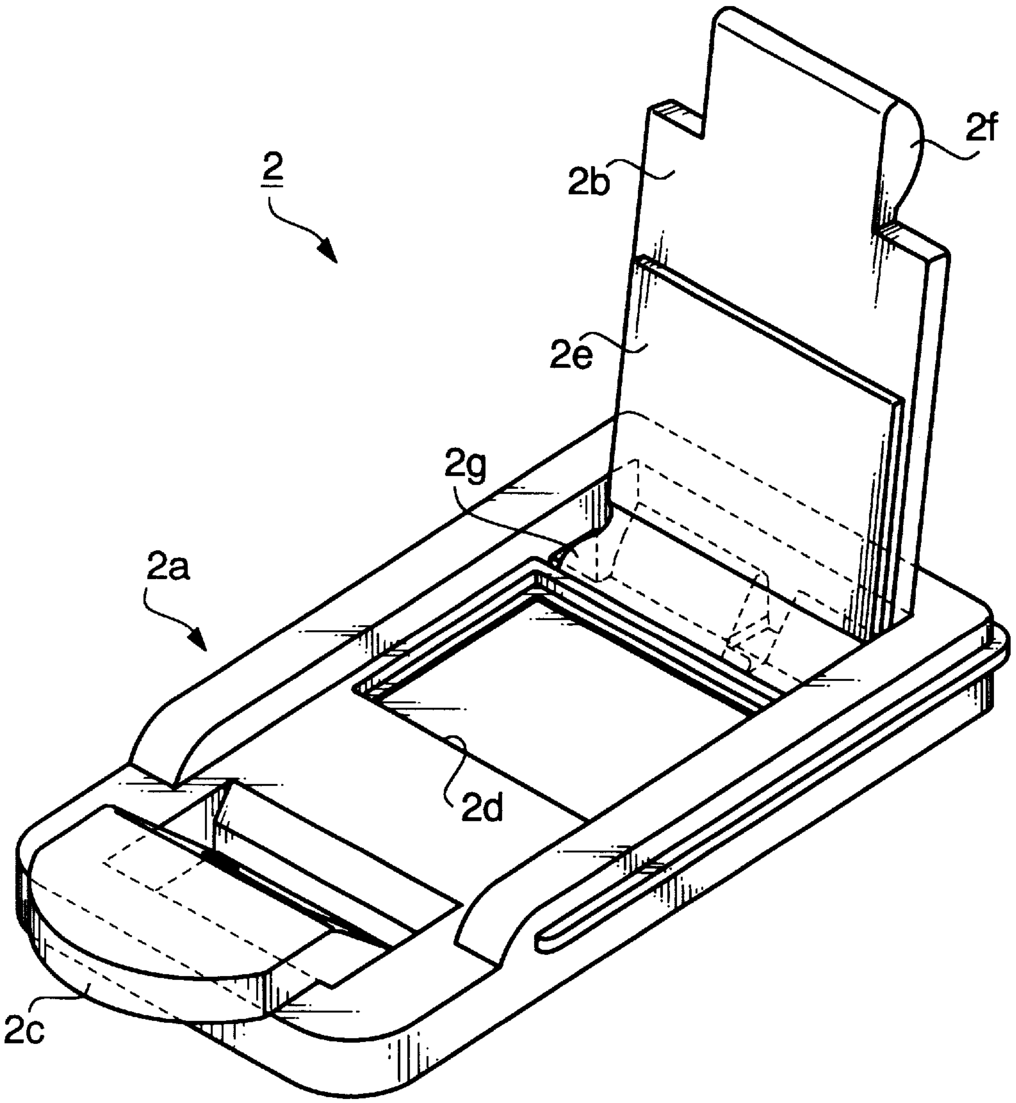
FIG. 3 is a perspective view of a tray of the stamp producing device of FIGS. 2A and 2B.
Figure 4:
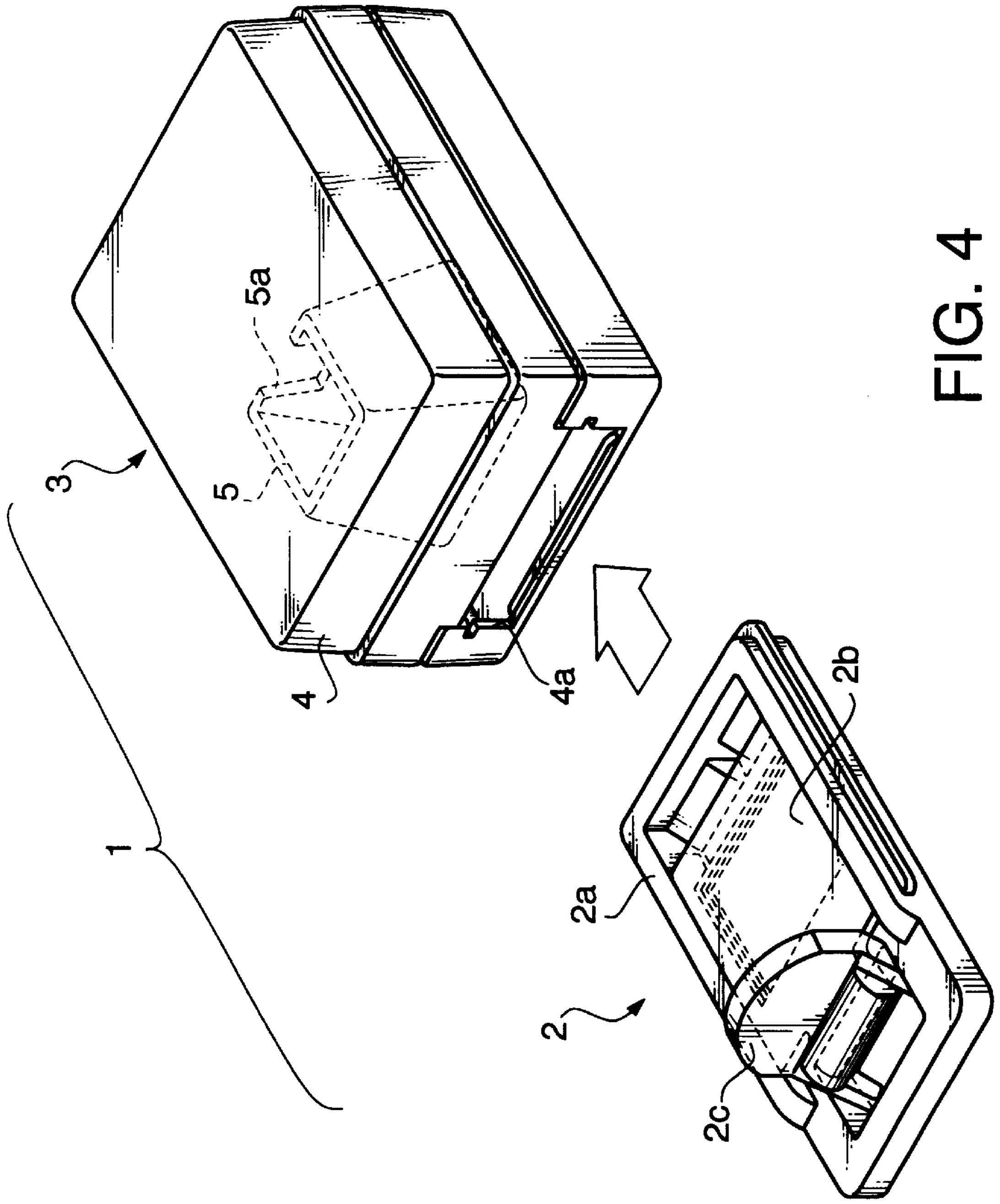
FIG. 4 is a perspective view of the stamp producing device of FIGS. 2A and 2B.

FIG. 3 is a perspective view of the tray 2. FIG. 4 is a perspective view separately showing the unit body 3 and the tray 2. The tray 2 includes a tray body 2*a* and a transparent cover 2*b* swingably provided to the tray body 2*a*. A rectangular concave 2*d* is provided at the center portion of the tray body 2*a*, for placing the base sheet 12 and other two sheets (an original sheet 11 and an intermediate sheet 13) thereon. The transparent cover 2*b* is pivoted by a pin 2*g* disposed at one side of the tray body 2*a* so that the transparent cover 2*b* can be opened or closed. In order to lock the transparent cover 2*b* in a closed state, a lock lever 2*c* is provided to the side (of the tray body 2*a*) opposite to the pin 2*g*. An engaging portion 2*f* provided at the tip of the transparent cover 2*b*. When the lock lever 2*c* is swing to an erected position (as shown in FIG. 4), the lock lever 2*c* holds the engaging portion 2*f* of the transparent cover 2*b*. When the lock lever 2*c* is swung to a laid position (as shown in FIG. 3), the lock lever 2*c* releases the engaging portion 2*f* so that the transparent cover 2*b* can be opened. The transparent cover 2*b* is made of a transparent acrylic resin or the like. The transparent cover 2*b* is provided with a transparent pressing portion 2*e* at the bottom thereof, which urges the base sheet 12, the original sheet 11 and the intermediate sheet 13 against the bottom of the concave 2*d*.

As shown in FIG. 4, the unit body 3 includes a box-shaped case 4. An insertion opening 4*a* is formed on the lower portion of the front wall of the case 4. The tray 2 can be inserted into the unit body 3 through the insertion opening 4*a*. A truncated-pyramid-shaped chamber 6 is formed in the upper portion of the case 4. The inner surfaces of the chamber 5 are covered with a film such as aluminum foil, which has a large reflectivity. As shown in FIG. 2A, the flash bulb 6 is detachably mounted to a mounting portion 5*a* formed on one side wall of the chamber 6. Batteries 8 are provided in the case 4, for supplying power to the flash bulb 6. The batteries 8 are connected to the flash bulb 6 via a contact member 7 provided therebetween. A switch 9 is provided in the vicinity of an internal wall of the case 4. When the tray 2 is inserted through the insertion opening 4*a* and is accommodated in the unit body 3, the switch 9 is urged by the tray 2 to be turned ON. Then, power is supplied (from the batteries 8) to the flash bulb 6, so that the flash bulb 6 flashes.

Figure 5A:
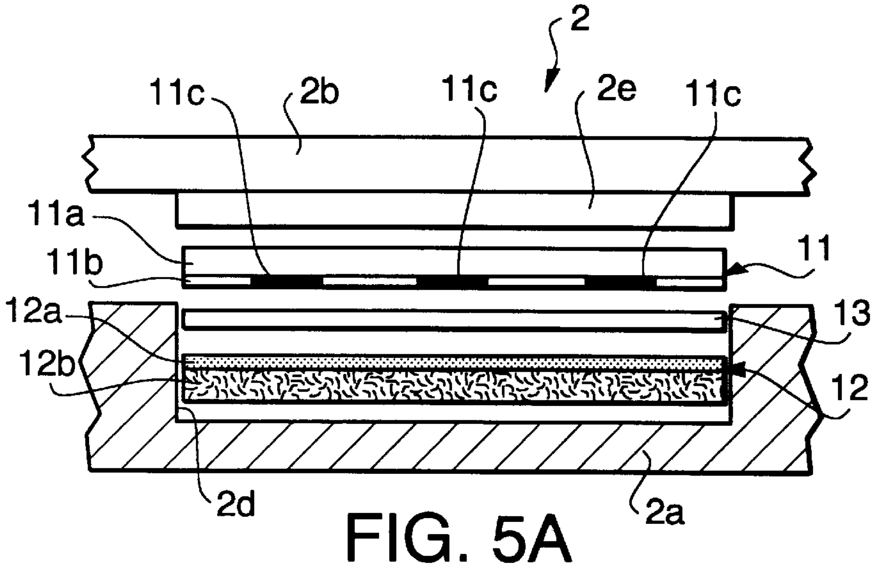
FIGS. 5A, 5B and 5C are sectional views illustrating the producing process of the printing sheet.
Figure 5B:
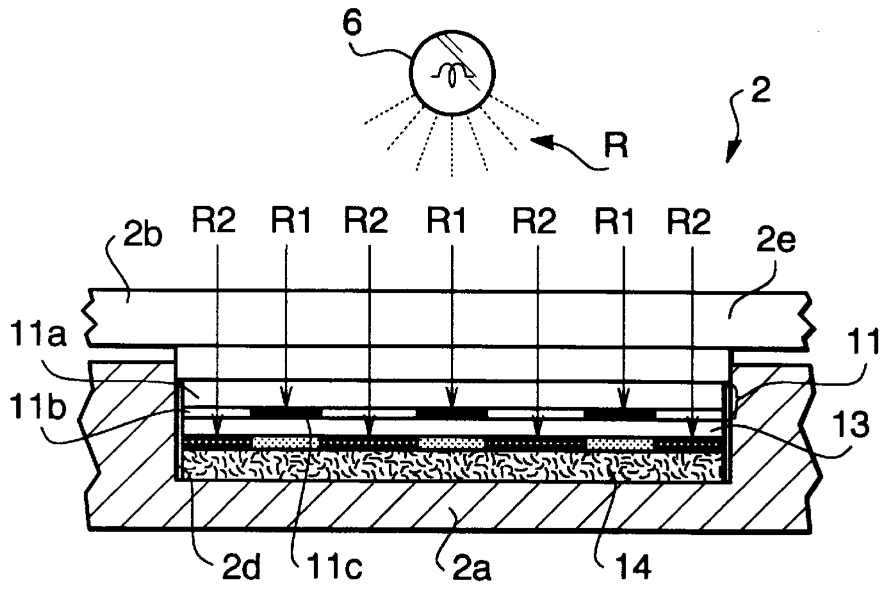
Figure 5C:
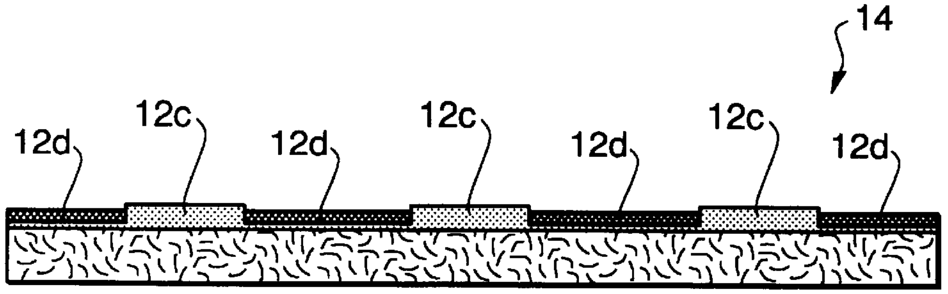

The method for producing the printing sheet is described. FIGS 5A, 5B and 5C are schematic views illustrating the method for producing the printing sheet.

First, the original sheet 11 carrying a desired image is described. As shown in FIG. 5A, the original sheet 11 includes a transparent sheet 11*a* and a photochromic layer 11*b* formed on the lower surface of the transparent base sheet 11*a*. The transparent sheet 11*a* has substantially uniform thickness and is made of synthetic resin such as polyethylene terephthalate (PET), polyvinyl chloride, or acrylonitrile-butadiene-styrene (ABS) resin. The melting point of the transparent sheet 11*a* is higher than the melting point of the base sheet 12. In particular, if the transparent sheet 11*a* is made of PET, the melting point thereof is approximately 230° C. Comparatively, the melting point of the base sheet 12 is approximately 120° C. (in case the base sheet 12 is made of plasticized polyurethane-based resin) or approximately 70° C. (in case the base sheet 12 is made of plasticized polyolefin-based resin). Thus, when the original sheet 11 and the base sheet 12 are laminated and heated, and when the base sheet 12 melts, the original sheet 11 does not melt.

The photochromic layer 11*b* has substantially uniform thickness. A shielding portion 11*c* is formed on the photochromic layer 11*b,* according to a desired image.

Although the shielding portion 11*c* has already been formed before the producing of the printing sheet 14, the producing process of the shielding portion 11*c* is shortly described. The photochromic layer 11*b* is formed by means of applying (or impregnating) an organic photochromic ink (manufactured by Teikoku Ink Kabushiki Kaisha) on the surface of the transparent sheet 11*a.* The photochromic layer 11*b* is normally colorless and transparent but turns blue and non-transparent when exposed to electromagnetic waves including ultraviolet rays. The photochromic layer 11*b* is selectively exposed to electromagnetic waves including ultraviolet rays, with a negative film placed thereon. With this, the exposed portion of the photochromic layer 11*b* turns blue and non-transparent. Thus, a shielding portion 11*c* is formed on the photochromic layer 11*b* according to desired image. Further, the photochromic layer 11*b* has a characteristics that the photochromic layer 11*b* returns colorless and transparent when the photochromic layer 11*b* is shielded from the radiation of ultraviolet rays for a predetermined time. Therefore, the original sheet 11 can be used as a new original sheet, enabling a user to form new image thereon. The original sheet 11 can be reused many times as long as the photochromic ink is not deteriorated.

The intermediate sheet 13 is placed between the base sheet 12 and the original sheet 11. The intermediate sheet 13 is transparent and its thickness is approximately 0.025 mm to 0.2 mm. The intermediate sheet 13 is made of PET and the melting point thereof is approximately 230° C., which is higher than that of the base sheet 12. Therefore, when the intermediate sheet 13 and the base sheet 12 are laminated and heated, and when the base sheet 12 melts due to heating, the intermediate sheet 13 does not melt.

Before producing the printing sheet, the tray 2 is removed from the unit body 3. Then, the transparent cover 2*b* of the tray 2 is opened (as shown in FIG. 3), by operating the lock lever 2*c* to release the engaging portion 2*f.* Then, the base sheet 12, the intermediate sheet 13 and the original sheet 11 are placed in the concave 2*d* of the tray 2. In this state, as shown in FIG. 5A, the base sheet 12 is placed so that the fibrous layer 12*b* is faced downward and that 12*a* of the base sheet 12. The original sheet 11 is overlaid on the intermediate sheet 13 so that the photochromic layer 11*b* of the original sheet 11 contacts the intermediate sheet 13.

After the base sheet 12, the intermediate sheet 13 and the original sheet 11 are placed in the tray 2, the transparent cover 2*b* is closed. The transparent cover 2*b* is locked by the engagement of the lock lever 2*c* and the engaging portion 2*f.* In this state, the pressing portion 2*e* of the transparent cover 2*b* urges the original sheet 11 against the base sheet 12. Then, the tray 2 is inserted into the unit body 3 through the insertion opening 4*a* (FIG. 2B). When the tray 2 is inserted into the unit body 3, the switch 9 is turned on, so that power is supplied from the batteries 8 to the flash bulb 6. With this, the flash bulb irradiates electromagnetic waves including infrared rays R.

Figure 6:
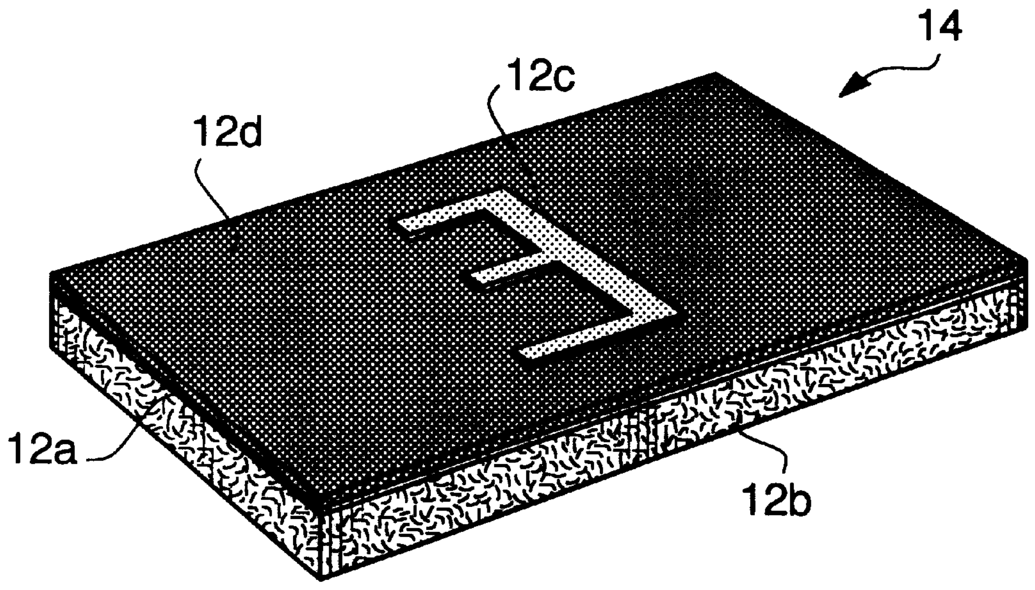
FIG. 6 is a perspective view of the printing sheet.

As shown in FIG. 5B, when the flash bulbs 6 flashes, the infrared rays R pass through the transparent cover 2*b,* the pressing portion 2*e* and the transparent sheet 11*a* of the original sheet 11, and irradiated on the photochromic layer 11*b.* The shielding portion 11*c* of the photochromic layer 11*b* blocks the infrared rays (R1 in FIG. 5B) and other portion of the photochromic layer 11*b* allows the infrared rays (R2 in FIG. 5B) to pass. The infrared rays passing through the photochromic layer 11*b* reach the porous layer 12*a,* which heats the porous layer 12 to cause pores thereof to melt and be sealed. Accordingly, a non-print portion 12*c* is formed on the porous layer 12*a,* which blocks the permeation of ink. On the other hand, since the infrared ray R1 blocked by the shielding portion 11*c* do not reach the porous layer 12*a,* a print portion 12*d* is formed on the porous resin payer 12*a,* which allows the permeation of ink. As shown in FIG. 5C, the porous layer 12*a* (including the print portion 12*d* and the non-print portion 12*c*) and the fibrous layer 12*b* constitute a printing sheet 14. FIG. 6 is a perspective view of the printing sheet 14. The print portion 12*d* and the non-print portion 12*c* are formed on the porous layer 12*a* according to a desired pattern, for example, "E".

Accordingly, the printing sheet 14 including a porous layer 12*a* carrying a pattern (the print portion 12*d* and the non-print portion 12*c*) and the fibrous layer 12*b* is formed by the above described process.

In the above described process, although the shielding portion 11*c* of the photochromic layer 11 is heated by the irradiation of the infrared rays, the heat is released via the intermediate sheet 13 (which is in contact with the surface of the photochromic layer 11). Thus, it is prevented that a part of the porous layer 12*a* which is to be the print portion 12*c* (corresponding to the shielding portion 11*c*) is unintentionally heated.

Figure 7:
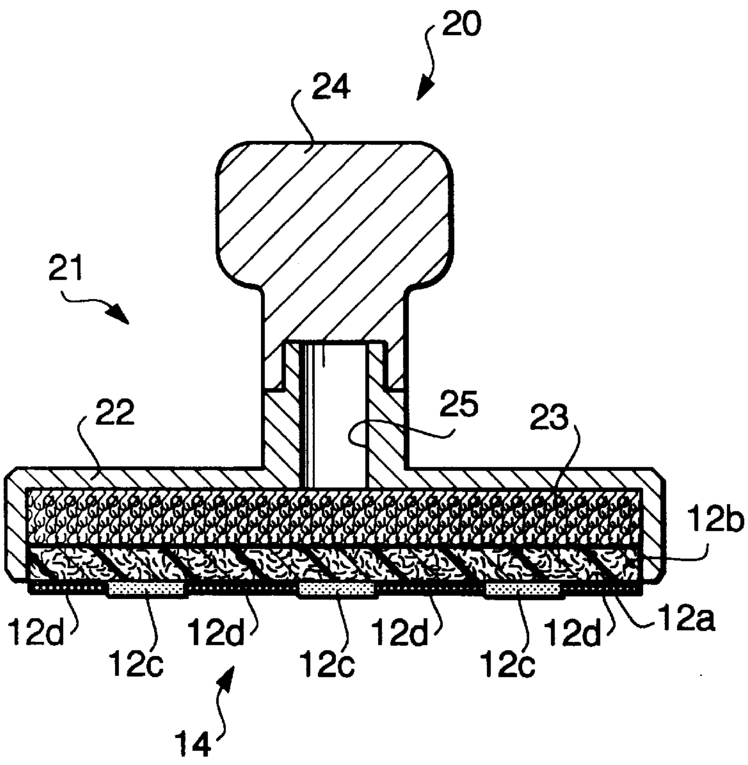
FIG. 7 is a sectional view of a stamp.
Figure 8A:
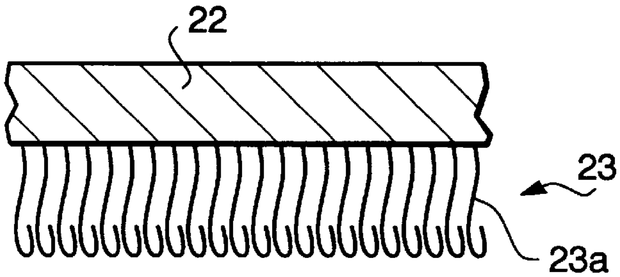
FIGS. 8A and 8B are an enlarged sectional view of a fibrous portion of the stamp.
Figure 8B:
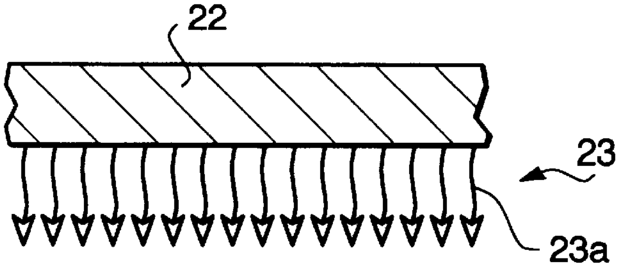

The structure of a stamp 20 using the printing sheet 14 is described. FIG. 7 is a sectional view showing a stamp 20. The stamp 20 includes a handle 24 held by the user and a stamp body 21 provided to the lower end of the grip 24. The stamp body 21 has a recess 22 which opens at the bottom end of the stamp body 21, so that the printing sheet 14 is fit into the recess 22. The stamp body 21 is made of plastic, metal or the like. A fibrous portion 23 is provided in the upper portion of the recess 22, for holding the printing sheet 14. FIG. 8A is a schematically enlarged view showing the fibrous portion 23. As shown in FIG. 8A, the fibrous portion 23 includes a large number of fibers 23*a* planted on the upper wall of the recess 22 and extending downward therefrom. The fibers 23*a* are made of synthetic resin or the like. Each fiber 23*a* has hook-shaped curved portion 23*b* at the lower end thereof. Alternatively, as shown in FIG. 8B, it is possible that each fiber 23*a* has an arrowhead-shaped tip.

The handle 24 is detachably provided to the stamp body 21. The stamp body 21 is provided with an ink supply port 25 beneath the handle 24, extends downward to the upper wall of the recess 22. When the handle 24 is detached from the stamp body 21, the ink supply port 25 is opened. In this state, the user can supply ink to the ink sheet 14 through the ink supply port 25.

As shown in FIG. 7, the printing sheet 14 is mounted to the recess 22 in such a manner that the non-woven fabric (or the raised fabric) of the fibrous layer 12*b* of the printing sheet 14 is entangled with the hook-shaped (or arrowhead-shaped) lower end of the fibers 23*a* of the fibrous portion 23. Thus, the printing sheet 14 can be mounted to the stamp body 21, by simply urging the printing sheet 14 against the fibrous portion 23.

On using the stamp 20, the user holds the handle 24 and forces the stamp 20 to a not-shown media such as a paper so that the lower surface (printing surface) of the printing sheet 14 is urged against the media. With this, ink impregnated in the fibrous layer 12*b* is permeated through the print portion 12*c* of the printing sheet 12 and transferred onto the media. Due to the elasticity of the fibrous layer 12*b*, a pressure distribution of the printing sheet 14 is uniform, even if the porous layer 12*a* is swollen.

On replacing the printing sheet 14, the printing sheet 14 can be easily removed from the recess 22 by simply peeling the printing sheet 14 from the fibrous portion 23. With this, the non-woven fabric (or the raised fabric) of the fibrous layer 12*b* of the printing sheet 14 is released from the fibers 23*a* of the fibrous portion 23. Therefore, a various kind of printing sheets 14 can be mounted to the stamp body 21, to form various kinds of images on the media.

The fibrous layer 12*b* has a characteristics such that the fibrous layer 12*b* is not swollen even if ink is impregnated therein. Since the porous layer 12*a* is integrally formed with the fibrous layer 12*b*, the deformation of the surface of the porous layer 12*a* is prevented, even if the porous layer 12*a* is swollen.

The amount of ink impregnated in the fibrous layer 12*b* is larger than that of the porous layer 12*a*. Thus, it is not necessary to provide a separate ink impregnating member (sponge-like) mat or the like) other than the printing sheet 14. Further, since spaces between fabrics of the fibrous layer 12*b* is larger than pores of the porous layer 12*b*, the ink can be impregnated into the printing sheet 14 in a short time.

Furthermore, since the fibrous layer 12*b* has an elasticity, the printing sheet 14 also has an elasticity. Due to the elasticity of the printing sheet 14, it is possible to apply a uniform pressure throughout the printing surface without providing a separate cushion member. Thus, a clear image is formed on a media.

Although the structure of a present invention is described herein with respect to the preferred embodiment, many modifications and changes can be made without departing from the spirit and scope of the invention.

For example, in the above-described embodiment, the flash bulb 6 is used as a heat source for melting the porous layer 12*a* of the base sheet 12. However, the flash bulb 6 can be replaced by a xenon tube or other light source which emits infrared rays. Also, the flash bulb 6 can be replaced by a heat generator such as a thermal head.

Further, the original sheet 11 can be replaced by a tracing paper or other paper which allows the electromagnetic waves to pass and which carries an image with shielding ink of a desired color (such as, black, white, gold, and silver). Still further, the porous layer 12*a* of the base sheet 12 can be made of any foamed material which can be formed flexible a porous sheet. Furthermore, carbon grains dispersed in the porous layer 12*a* can be replaced by any substance which generated heat due to heating when irradiated by electromagnetic waves (for example, a high-molecular substance such as silver chloride and silver bromide, or a light energy absorbing substance).

The present disclosure relates to subject matter contained in Japanese Patent Application Nos. HEI 9-78599, filed on Mar. 28, 1997 and HEI 9-79665, filed on Mar. 31, 1997 which are expressly incorporated herein by reference in its entirety.

What is claimed is:

1. A printing sheet used in a stamp, said printing sheet comprising:

a porous layer in which ink can be impregnated, said porous layer tending to deform when impregnated with ink; and a fibrous layer made of fibers, said fibrous layer being attached to one side of said porous layer and reducing the deformation of the porous layer due to ink impregnation;

wherein said porous layer carries a pattern on a surface thereof, said pattern including a non-print portion which blocks permeation of said ink and a print portion which allows permeation of said ink.

2. The printing sheet according to claim 1, wherein said fibrous layer is so constituted that ink can be impregnated therein.

3. The printing sheet according to claim 1, wherein said fibrous layer has elasticity.

4. The printing sheet according to claim 1, wherein said fibrous layer comprises one of a non-woven fabric and a textile having raised fabrics.

5. The printing sheet according to claim 1, wherein said porous layer comprises a foamed resin, and wherein said foamed resin of said porous layer and said fibers of said fibrous layer entangle with each other.

6. The printing sheet according to claim 1, wherein said porous layer includes a heat-generating material which generates heat when exposed to electromagnetic waves.

7. The printing sheet according to claim 6, wherein said porous layer includes carbon grains, and said carbon grains generate heat when exposed to infrared rays.

8. A base sheet used to produce a printing sheet used in a stamp, said base sheet comprising:

a porous layer in which ink can be impregnated, said porous layer tending to deform when impregnated with ink; and a fibrous layer made of fibers, said fibrous layer being attached to one side of said porous layer and reducing the deformation of said porous layer due to ink impregnation;

wherein a pattern can be formed on a surface of said porous layer by heating said surface according to a desired image, said pattern including a non-print portion which blocks permeation of said ink and a print portion which allows permeation of said ink.

9. The base sheet according to claim 8, wherein said fibrous layer is so constituted that ink can be impregnated therein.

10. The base sheet according to claim 8, wherein said fibrous layer has elasticity.

11. The base sheet according to claim 8, wherein said fibrous layer comprises one of a non-woven fabric and a textile having raised fabrics.

12. The base sheet according to claim 8, wherein said porous layer comprises a foamed resin, and wherein said foamed resin of said porous layer and said fibers of said fibrous layer entangle with each other.

13. The base sheet according to claim 8, wherein said porous layer includes a heat-generating material which generates heat when exposed to electromagnetic waves.

14. The printing sheet according to claim 13, wherein said porous layer includes carbon grains, and said carbon grains generate heat when exposed to infrared rays.

15. A base sheet used to produce a printing sheet used in a stamp, said base sheet comprising:

a porous layer in which ink can be impregnated, said porous layer tending to deform when impregnated with ink; and a deformation reducing material which is attached to one side of said porous layer and reduces the deformation of said porous layer due to ink impregnation;

wherein a pattern can be formed on a surface of said porous layer by heating said surface according to a desired image, said pattern including a non-print portion which blocks permeation of said ink and a print portion which allows permeation of said ink.

16. A stamp comprising:

a stamp body; and a printing sheet mounted to said stamp body, wherein said printing sheet comprises a porous layer in which ink can be impregnated and a fibrous layer made of fibers, the fibrous layer being attached to one side of said porous layer, the porous layer tending to deform when impregnated with ink and the fibrous layer reducing the deformation of the porous layer due to ink impregnation;

wherein said porous layer carries a pattern on a surface thereof, said pattern including a non-print portion which blocks permeation of said ink and a print portion which allows permeation of said ink.

17. The stamp according to claim 16, further comprising a fibrous portion provided to said stamp body, said fibrous layer being fixed to said fibrous portion.

18. The stamp according to claim 16, wherein said fibrous layer has elasticity.

19. The stamp according to claim 16, wherein said fibrous layer comprises one of a non-woven fabric and a textile having raised fabrics.

20. The printing sheet according to claim 16, wherein said porous layer comprises a foamed resin, and wherein said foamed resin of said porous layer and said fibers of said fibrous layer entangle with each other.

21. The base sheet according to claim 15, wherein said porous layer includes a heat-generating material which generates heat when exposed to electromagnetic waves.

22. The base sheet according to claim 21, wherein said porous layer includes carbon grains, and said carbon grains generate heat when exposed to infrared rays.

23. A printing sheet used in a stamp according to claim 1, wherein said fibrous layer is attached to said porous layer by conjugation utilizing heat.

24. A printing sheet used in a stamp according to claim 1, wherein said fibrous layer is attached to said porous layer by adhesive.

25. A printing sheet used in a stamp according to claim 1, wherein said porous layer is attached to said fibrous layer by being formed integrally with said fibrous layer.

26. A method for forming the base sheet of claim 8, comprising:

dissolving material used to form a porous layer with a solvent;

coating said dissolved material on a fibrous layer;

soaking said fibrous layer coated with said dissolved material in water to remove a water-soluble material, thereby leaving hollow portions in said material to form a porous layer; and performing at least one of drying and heat treating to said porous layer and said fibrous layer.

27. A base sheet according to claim 8, wherein said fibrous layer is attached to said porous layer by conjugation utilizing heat.

28. A base sheet according to claim 8, wherein said fibrous layer is attached to said porous layer by adhesive.

29. A base sheet according to claim 8, wherein said porous layer is attached to said fibrous layer by being formed integrally with said fibrous layer.

30. A base sheet according to claim 8, wherein said fibrous layer is directly attached to said porous layer.

31. A base sheet according to claim 15, wherein said deformation reducing material is attached to said porous layer by conjugation utilizing heat.

32. A base sheet according to claim 15, wherein said deformation reducing material is attached to said porous layer by adhesive.

33. A base sheet according to claim 15, wherein said porous layer is attached to said deformation reducing material by being formed integrally with said deformation reducing material.

34. A base sheet according to claim 15, wherein said deformation reducing material is directly attached to said porous layer.

35. A stamp according to claim 16, wherein said fibrous layer is attached to said porous layer by conjugation utilizing heat.

36. A stamp according to claim 16, wherein said fibrous layer is attached to said porous layer by adhesive.

37. A stamp according to claim 16, wherein said porous layer is attached to said fibrous layer by being formed integrally with said fibrous layer.

38. A stamp according to claim 16, wherein said fibrous layer is directly attached to said porous layer.

39. A printing sheet used in a stamp according to claim 1, wherein said fibrous layer is directly attached to said porous layer.

* * * * *